United States Patent Office 3,332,937
Patented July 25, 1967

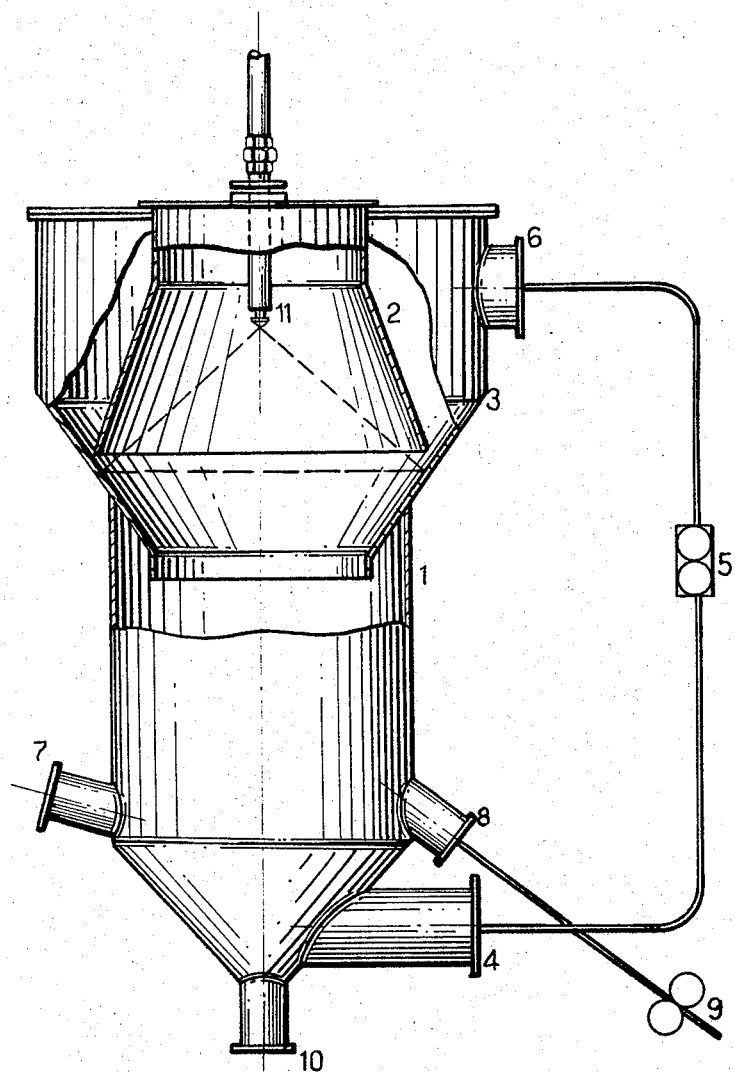

3,332,937
PROCESS AND AN APPARATUS FOR DILUTING AN ACETIC ACID SOLUTION OF CELLULOSE ACETATE WITH WATER
Luciano Jori, 4 Via Freguglia, Milan, Italy
Filed June 3, 1963, Ser. No. 285,092
Claims priority, application Italy, June 22, 1962,
12,505/62
3 Claims. (Cl. 260—230)

The present invention relates to a process for diluting an acetic acid solution of cellulose acetate with water.

As in the case of other batch processes, in the production of cellulose acetate it has been attempted to transform the batch process into a continuous process. One of the biggest difficulties to be overcome, however, is that encountered at the moment of the precipitation of the cellulose acetate from its acetic acid solution.

It is known that the acetylation process consists of an esterification of the cellulose, said esterification being effected after a preliminary treatment, by acetic anhydride in the presence of acetic acid as solvent, said acetylation occurring in homogeneous phase and in the presence of a catalyst, normally sulphuric acid. Under these conditions, cellulose triacetate will form, which, however, does not serve the purpose for certain applications. Thus, for instance, this compound is useless for the production of textile fibers from acetonic solutions, and is useless generally for the preparation of solutions in acetone, and is also useless for certain uses as plastic material. For these uses, the acetylation degree is too high, and must be reduced until obtaining a product having an acetyl number about 54. This will be obtained by submitting the triacetate, even in acetic acid solution, to an hydrolysis, or to a saponification. After this operation has been carried out up to the desired limit, the cellulose acetate will be precipitated from its acetic acid solution and this is done by pouring the acetic acid solution itself into water.

This operation shows certain difficulties also in the batch process; these difficulties are remarkably increased when the batch process is transformed into a continuous process. The precipitated cellulose acetate is submitted to a thorough washing in order to remove all the acetic acid therefrom. However, often in the precipitations crumbs of product will be formed, having a horny aspect which cannot be well washed. In the batch process, in these instances, the duration of washing is extended, but in the continuous process, of course, this is not possible, as the durations of time are tied to the other operations.

It is known that the precipitation of the cellulose acetate from its acetic acid solution is rendered easier, even effecting said precipitation by pouring it into water, if before this operation a certain amount of water is added to the acetic acid solution, preferably in the form of a diluted acetic acid solution, so as to bring the solubility of the cellulose acetate to its limit, while avoiding a precipitation thereof, even in minimum amounts. By effecting the precipitation of the acetate from a solution to which water has been added as aforedescribed, regular grains of cellulose acetate will be obtained, free from particles having a horny aspect, and also free unduly small particles, having a powder aspect, also said particles being hardly washable.

It will be suitable to add the water to the acetic acid solution of cellulose acetate, in the form of a low concentration acetic acid water solution. Thus for instance for an acetic acid solution of a cellulose acetate soluble in acetone, having an acetyl number about 54.5 and a Baumé viscosity about 45, it will be convenient to use an 8–10% acetic acid water solution.

From a 12% cellulose acetate solution it will be possible, when operating under given conditions, to reduce the acetic acid contents down to 53–54%.

This dilution can be effected, however, under particular conditions without incurring the formation of acetate crumbs or separation of acetate powder which, as aforesaid, hinder a good washing of the cellulose acetate after its precipitation.

It has been now found, and this is the object of the present invention, that this dilution can be effected in the best way by using the apparatus as described later on, wherein the cellulose acetate acetic acid solution flows in a relatively thin layer along an inclined and preferably frustoconical wall. While the cellulose acetate solution moves along this wall, said solution will contact the dilute acetic acid solution which will have been previously atomized. This occurs within a reservoir, into which enters continuously the cellulose acetate solution to be diluted and the diluted acetic acid solution, and wherefrom also the diluted cellulose acetate solution continuously flows out. The cellulose acetate solution preferably circulates in an endess circuit with a speed remarkably higher than the feeding rate.

The layer of the cellulose acetate acetic acid solution flowing on the frustoconical wall will be 5–15 mm. thick, preferably 8–10 mm. thick.

For a better understanding, the process and the apparatus will be hereinafter described with reference to the attached drawing.

In the drawing, the reference numeral 1 denotes a tank having a greater diameter at its top portion, and tapered downwards so as to form the frustoconical wall 3. Inside the tank, a second frustoconical wall 2 is provided, the lower portion of which is close to the wall 3 so as to create a circular slot several millimeters (mm.) wide, so that the cellulose acetate solution entering into the top portion of the tank 1 through the inlet 6 is carried to flow on the wall 3, under the wall 2 in a thin layer. Through the atomizer 11 enters into the tank the acetic acid diluted solution. The atomized diluted acetic acid solution strikes the cellulose acetate solution while the latter flows downwardly along the wall 3. This solution collects in the bottom portion of the tank 1, wherefrom it will be extracted through the coupling tube 4 by means of the pump 5 carrying the solution into the tank 1 through the inlet 6. Into the tank 1 is continuously fed the cellulose acetate solution to be diluted through the inlet 7, and through the outlet 8 and by means of the pump 9, the corresponding amount of diluted solution is continuously removed.

Within the tank 1 is always maintained a liquid level above the two fittings 7 and 8 and said level is ensured by the level of a feeding tank (not shown in the figure) which feeds tank 1 through fitting 7.

Hereinafter by way of non limitative example, a practical embodiment of this invention will be described.

EXAMPLE

The dilution apparatus as above described is fed, with 4000 kg./hour of an acetic acid solution of cellulose acetate containing 12% cellulose acetate and 65.4% acetic acid, the balance being water and impurities coming from the cellulose acetylation process. The cellulose acetate has an acetyl number 54, and a Baumé viscosity 44. Through the atomizer, 1,080 kg./hour of water solution of 8% acetic acid are introduced into the same apparatus. The solution of cellulose acetate is recycled into the dilution apparatus at a rate of 120 m.³/hour. From the apparatus are extracted 5080 kg./hour of perfectly limpid diluted solution of acetate of cellulose, containing 9.45% of cellulose acetate and 53.20% acetic acid.

When this solution is poured into water, by the technical known means, an easily washable product is obtained, free from horny crumbs and powder.

The present invention has been described in one preferred embodiment, it being however understood that variations might be practically adopted without departing from the scope of the present invention.

I claim:
1. In a process for the water dilution of an acetic acid solution of cellulose acetate by means of a water solution of acetic acid, the improvement according to which the acetic acid-cellulose acetate solution to be diluted is contacted with an atomized aqueous solution of acetic acid without inducing precipitation of cellulose acetate, while the acetic acid cellulose acetate solution flows downwardly as a thin layer along an inclined wall, said acetic acid solution of cellulose acetate being maintained strongly stirred by causing said solution to continuously recirculate, said water solution of acetic acid being added to the acetic acid solution of cellulose acetate during said dilution in an amount which is less than the limit of the solubility of the cellulose acetate.

2. A process as in claim 1 wherein the liquid layer on the inclined wall is 5 to 15 mm. thick.

3. A process as in claim 1 wherein the liquid layer on the inclined wall is 8 to 10 mm. thick.

References Cited

UNITED STATES PATENTS 2,772,267  11/1956  Malin et al. _____ 260—230

FOREIGN PATENTS 813,625  5/1959  Great Britain.

DONALD E. CZAJA, *Primary Examiner.*

LEON J. BERCOVITZ, *Examiner.*

R. W. MULCAHY, *Assistant Examiner.*